J. E. LUNDGREN.
MODE OF PULVERIZING AND PREPARING FOR USE COAL, &c.
No. 42,257. Patented Apr. 5, 1864.
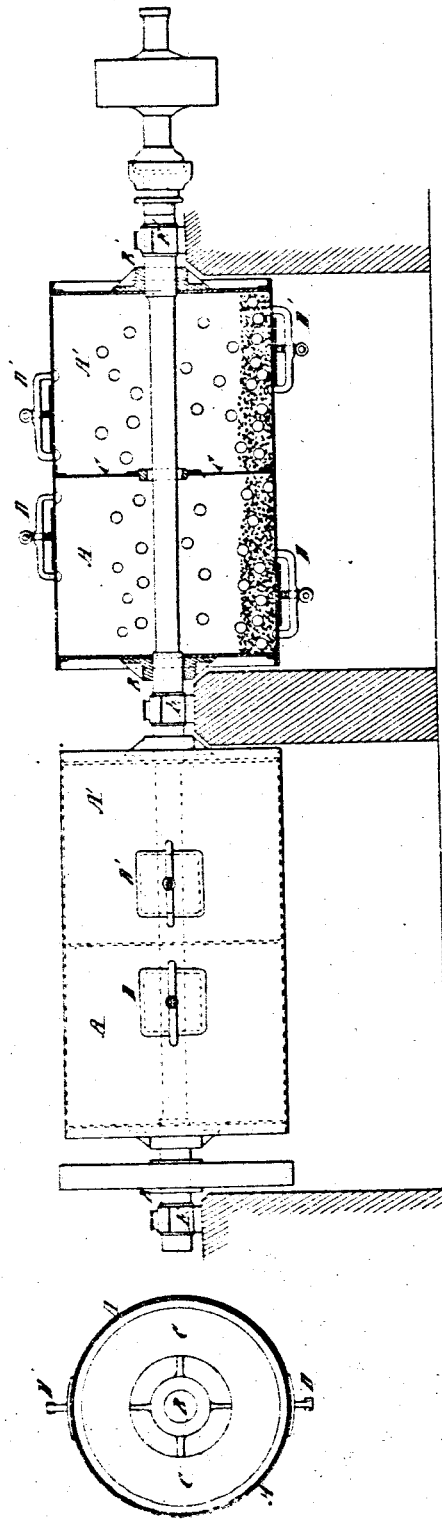

UNITED STATES PATENT OFFICE.

JOHN EPHRAIM LUNDGREN, OF STOCKHOLM, SWEDEN, ASSIGNOR TO HIMSELF AND CLAUDIUS E. HABICHT, OF NEW YORK CITY.

IMPROVED MODE OF PULVERIZING AND PREPARING FOR USE COAL, &c.

Specification forming part of Letters Patent No. 42,257, dated April 5, 1864.

*To all whom it may concern:*

Be it known that I, JOHN EPHRAIM LUNDGREN, of Stockholm, in the Kingdom of Sweden, have invented certain new and useful improvements in pulverizing mineral, vegetable, and animal substances capable of being broken and pulverized for various purposes in the arts; and I hereby declare that the following is a full, clear, and exact description of the same, reference being had to the accompanying drawings, in which—

Figure 1 is an end view, Fig. 2 a side elevation, and Fig. 3 a sectional view, of an apparatus used in connection with and constructed according to my invention.

My invention relates to certain mechanical means of reducing friable or pulverizable substances, whether vegetable, mineral, or animal, to a powder more or less fine, according to the uses they are intended for; also, to new and useful applications to the arts of particular substances so reduced: and my invention consists, first, in the method hereinafter more fully explained of pulverizing to any given degree of fineness vegetable, mineral, or animal substances of a friable nature, or substances capable of being reduced to powder by means of balls or the mechanical equivalents thereof in motion in cylinders revolving upon their axes; secondly, in the production of a substitute for lamp-black and other similar carbonaceous matter in its various application in the arts by pulverizing in the manner referred to an impalpable powder, animal, vegetable, or mineral coal; thirdly, in the production of new articles of manufacture, in which coal, pulverized as referred to, is used in lieu of lamp-black and other impalpable carbonaceous powder as one of the ingredients.

To enable others to make and use my invention, I shall now proceed to describe the manner in which my said invention is or may be carried into effect.

The apparatus in which the pulverization of friable substances, or substances capable of being reduced to powder, is effected, consists of one or more cylinders, each of which is divided into compartments A A' by means of partitions C. These compartments may be arranged upon one and the same shaft or may constitute separate and independent cylinders arranged in a row upon one axis. The cylinders are provided with an axle-tree or trunnions, B B', which revolve in fixed bearings or brackets E E' on rotation being imparted from some prime mover to the main shaft. Each cylinder or compartment is provided with an aperture or man-hole closed during the operation of the apparatus by means of doors, slides, or other contrivances, so as to prevent the dust or powder from passing through the joint. In the annexed drawings the covers are shown to consist of plates firmly secured to their seats by means of screws D D'. Through this aperture are introduced into the interior of the cylinder small balls, made of cast-iron, glass, marble, or other material suitable for the functions they are intended to perform. They are made of varying sizes, degrees of hardness, and weight, and are used in numbers varying with the friability or cohesion of particles of the substances to be powdered. Through the same aperture are also introduced the substances to be pulverized. It will be understood that if rotary motion be imparted to the cylinders the balls are caused to fall in constant shower upon the mass and thus break and crush it to a more or less fine powder, or, if desired, to an impalpable powder, according to the length of time the action of the balls in the cylinders is continued. The substances thus operated upon are, by the revolution of the cylinder, constantly turned over and kept stirred, so that fresh surfaces or particles thereof are exposed to the pounding action of the balls. When the pulverization is completed, the covers are removed and sieves or fine grates are substituted therefor. Revolution of the cylinders is then resumed, and the powder is sifted and collected in a suitable receptacle.

In the above description I have shown the construction and operation of the apparatus as applied to the pulverization of any substance capable of being reduced to powder. Ores, emery, coal, and many other substances used in the arts in a powdered condition may be reduced in this way in the most expeditious manner and at comparatively small cost of power and labor. There are, however, certain new applications, which, on account of their importance in special arts, will create new branches of industry and have for effect the production of new articles of manufacture. To illustrate, I refer to the pulverization of coal, whether vegetable, mineral, or animal. The carbonaceous matter heretofore almost exclusively used in certain manufactures—such as black ink, paint, varnish, leather, wood, &c.—consisted of lamp-black or other impalpable and unalterably black powder, which, owing to the cost attending its manufacture, rendered these articles comparatively expensive. By my invention I am enabled to reduce coal of whatever derivation to an impalpable powder, which answers the purpose of such manufactures equally as well and has the additional advantage of being free of empyreumatic odor, which is inherent to lamp-black. Coal, reduced in the manner hereinbefore described, may also be used in the manufacture of sugar, for the clarification and filtration of saccharine juices, and for other purposes.

In conclusion, I would observe that I am aware that balls have been used in revolving barrels for the purpose of pulverizing various substances, but in such apparatus the operation of pulverization is effected on a principle differing essentially from the above described, in this, that the balls are very heavy, the barrels of comparatively small diameter and rotating with comparatively slow speed, so that a rolling motion is imparted to the balls which crush the matter to be pulverized by rolling over it. In my improved apparatus the balls are small, the cylinders are comparatively large, and their speed of revolution is such as to cause the balls to shower upon the mass to be reduced, so that by the combined action of the momentum due to the fall of the balls and rolling friction the mass to be pulverized is more perfectly and speedily triturated than this could be done by any machine or method heretofore known or used.

Having thus fully described my invention, I shall state my claims as follows:

1. The method herein described of pulverizing to any given degree of fineness vegetable, mineral, or animal substances of a friable nature or substances capable of being reduced to powder by means of balls, or the mechanical equivalent thereof, in motion in cylinders revolving upon their axes.

2. The production of a substitute for lamp-black and other similar carbonaceous matter in its various applications in the arts, by pulverizing, in the manner referred to, to an impalpable powder animal, vegetable, or mineral coal.

3. The production of new articles of manufacture, in which coal, pulverized as referred to, is used in lieu of lamp-black and other impalpable carbonaceous matter as one of the ingredients.

In testimony whereof I have signed my name to this specification before two subscribing witnesses.

J. E. LUNGDREN.

Witnesses:
  E. JAUME,
  E. SHERMAN GOULD.